July 6, 1948.  R. W. BROWN  2,444,724
BEARING FOR ROCK BITS
Filed Sept. 19, 1944
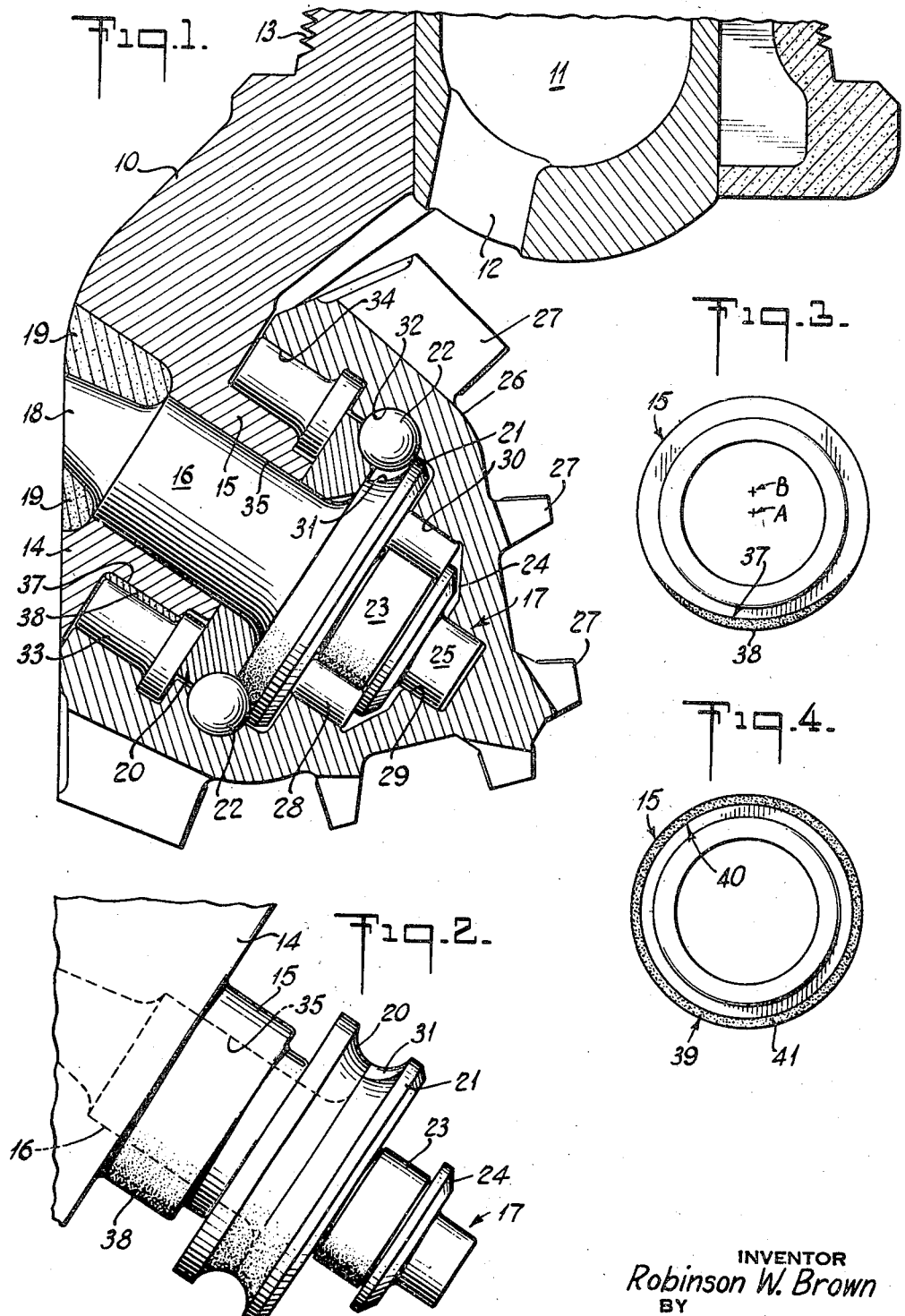
INVENTOR
Robinson W. Brown
BY
Raymond G. Mullee
ATTORNEY Patented July 6, 1948

2,444,724

UNITED STATES PATENT OFFICE 2,444,724

BEARING FOR ROCK BITS

Robinson W. Brown, Oklahoma City, Okla., assignor to Chicago Pneumatic Tool Company, New York, N. Y., a corporation of New Jersey Application September 19, 1944, Serial No. 554,763

3 Claims. (Cl. 308—216)

This invention relates to ball and roller bearings, particularly of the type employed in earth boring drill bits for mounting the roller cutters upon the bit head.

An object of the invention is to increase the durability of drill bits by the application of an impact and abrasion resisting alloy to the loaded portions of the roller and/or ball raceways thereof.

An additional object of the invention is thus to increase the useful life of such drill bits without materially increasing the manufacturing cost thereof.

A further object is to apply alloys of the indicated character permanently to the loaded portions of the raceways in the spindle for the ball and roller bearings, so that the materials thus applied will be inseparable on the raceways and therefore virtually integral therewith.

A feature of the invention is that raceways for both ball and roller bearings may be reinforced in the same structure against spalling and abrasion according to the same general principle.

Other objects and the features of the present invention will appear more fully from the following description, taken in connection with the accompanying drawing in which:

Fig. 1 is a central vertical section of part of a drill bit made according to the invention, disclosing the construction of the raceways of the ball and roller bearings;

Fig. 2 is a side elevation of a part of the bit of Fig. 1, showing the roller cutter spindle provide with axially aligned ball and roller raceways;

Fig. 3 is an end elevation of the annular shaft forming the larger cylindrical roller bearing raceway normally integral with the support upon the bit head, but omitting the latter as well as all other bearing raceways, and disclosing particularly how the lower or loaded portion alone of the raceway is reinforced or provided with an insert according to one form of the invention; and Fig. 4 is a similar view of a modification showing one of the raceways reinforced about the entire periphery thereof.

The instant application is a continuation in part of the copending application of the present applicant for Bearing for rock bits, filed October 1, 1943, under Serial No. 504,555, now abandoned.

In the drilling of oil and gas wells, the drill bit is subjected to severe shocks and wear which are caused by a combination of actual abrasion and impact under severe compression stresses. The bearings involved sustain an average pressure of several tons due to the weight of the drill bit and superstructure, particularly the drill stem. The maximum instantaneous force transmitted through the bearings is much higher, however, because the weight does not rest on the bearings uniformly but is transmitted in the form of shocks partly occasioned by the uneven character of the surface at the bottom of the hole being drilled. Any lost motion occurring between the cutter and its spindle, arising from looseness in the bearings, magnifies the shocks and tends to cause a destructive hammering.

During the past few years it has been shown that in metals and alloys there is no direct relation between hardness and wear or abrasion resistance. Many alloys, most of which belong to the general classification including chrome, cobalt and tungsten alloys, have recently been developed which retain their abrasion resistance even at relatively low degrees of hardness. These alloys have a relatively high degree of ductility, or impact resistance, as compared with case hardened steels or tool steels, and at the same time, are more resistant to abrasion than the latter. While "hard facing" alloys have been used on the mating surfaces of plain or friction type bearings, according to present knowledge, none of the abrasion resistant alloys pertaining to this invention have ever been used on the raceways of rolling bearings for the purpose of preventing the common failure known as spalling.

When rolling bearings are included in the drill bit the races thereof are usually made of a carburizing steel and case hardened or carburized to a range within 55 to 62 Rockwell "C" to increase wear resistance; but it has been found that at this degree of hardness the races are subject to the mentioned chipping and spalling, and are not particularly wear resistant. In drill bits employing ball bearings for retainers, the balls are even deformed or damaged to such an extent that they fail to retain the cutter. When the cutter becomes detached from the spindle it inhibits further drilling, thereby requiring an expensive "fishing" operation and occasionally resulting in a lost well.

In view of the foregoing objects and in order to overcome the mentioned disadvantages, it is now proposed to fix permanent and virtually integral inserts of wear, impact and abrasion resistant alloys, metals and the like, having high impact resistance, to at least the loaded sections of the rolling bearing races.

The illustrative embodiment of the invention shown in Fig. 1 comprises a bit head 10 in which is mounted a wash pipe 11 having an outlet 12 for flushing fluid. The bit head has three downwardly extending rigid legs 14 (one being shown), each leg forming a spindle support provided with an integral annular shaft 15 exteriorly forming a cylindrical raceway for roller bearings to roll upon the same, said shaft being axially inclined downwardly and inwardly toward the central axis of revolution of the bit. The mentioned annular shaft is initially made hollow to receive the stem 16 of a removable cutter pin generally indicated at 17, the tail 18 of the stem being welded, brazed or otherwise secured in place at 19, 19 in the rigid support 14 in due order of assembly as will presently appear.

Upon the pin is mounted a thrust washer 20 adapted to fit snugly upon the stem 16 against a corresponding flange 21 which is integral with the pin. The washer 20 and flange 21 have registering arcuate recesses which together provide a raceway for a row of ball bearings 22. Beyond said raceway is a cylindrical bearing surface or roller raceway 23, bounded by a retaining flange 24, the pin 17 terminating beyond said flange in a cylindrical pilot portion 25. It is thus evident that the spindle comprises the shaft 15, the inserted pin 17 and the thrust washer 20, the three sections all being made of steel and forming a unitary structure in operation.

A generally conical roller cutter 26 provided with a plurality of peripheral cutting teeth 27 is assembled with rolling bearings on the spindle, the latter engaging raceways on said spindle in somewhat conventional manner, but due to the particular construction of the illustrative bit, a certain order of assembling the parts is followed. First, the cylindrical nose rollers 28 are placed in position on the spindle pin 17 about the smaller cylindrical bearing surface or roller raceway 23 between the flange 21 and flange 24; and the spindle with these rollers is inserted into the roller cutter 26 with the pilot portion 25 engaging in an inner bore 29 in the nose of the cutter and the nose rollers 28 engaging in a counterbore 30 in the latter. The ball bearings 22 are then introduced by way of an assembling ball groove 31 in the upper end of flange 21 into contact with the ball raceway 32 in the cutter, and the thrust washer 20 thereafter fitted over stem 16 of pin 17 so as to imprison said ball bearings between the ball raceways. Subsequently, the roller bearings or rollers 33 are assembled within the cutter against the outer counterbore or roller raceway 34 thereof and the stem 16 of the pin 17 inserted into thhe aperture 35 in the spindle support 14 while sliding the roller bearings 33 in upon the spindle shaft or roller raceway 15, after which the tail 18 of the pin is welded or otherwise fixed in position in the support as already outlined. The cutter is retained on the spindle by the balls 22 and also by integral heads formed on alternate rollers 33.

During rotation of the drill bit about its vertical axis, the roller cutter 26 rotates about the spindle axis in well known manner by direct contact with the rock or the like beneath the same. It is self-evident that the lower sections of the rolling bearing surfaces or raceways upon the spindle during operation must carry the weight of the bit and also the stem and superstructure and thus bear the brunt of the wear and tear incident to said operation. Hence, in practice these bearing sections tend to wear away and become chipped, spalled and otherwise injured so as to be worn out before serious wear is apparent on the other sides of the same rolling bearing raceways. In order to reinforce said raceways (usually made of steel, case hardened, as already mentioned) and thereby render said raceways highly resistant to spalling wear and/or abrasion, a limited part or area of the surface of each raceway is reinforced, as for example may be noted at 37 (Fig. 1), by first removing a portion of the raceway, as will immediately be explained, after which a wear or abrasion resisting alloy, or material highly resistant to impact, is fused, cemented, welded, brazed, deposited or otherwise applied (Fig. 3). As an example of such an alloy the following analysis is given: iron about 37%, tungsten about 9%, chromium about 17%, molybdenum about 4%, cobalt and nickel about 28%, vanadium about .9%, and carbon about 2.5%. This alloy is not a steel and has a Rockwell hardness index of approximately C-45. Removal of part of the raceway is preferably performed by first turning the steel bearing member (shaft 15, washer 20, or inserted pin 17, as the case may be) about a normal center A to form the top and side surfaces thereof. Then the steel member is turned eccentrically about a second center B to form a crescent shaped space generally indicated at 37 to receive the alloy 38 or like insert. Next, the steel member is carburized and cooled slowly after which the alloy is welded on to fill the crescent shaped space so as to become a permanently fixed portion upon, and hence, virtually integral part of, the spindle or bearing member. The latter is thus again built up to a generally full rounded form and the bearing with the alloy in place is finally finished by cutting or grinding the same to a cylindrical surface concentric with the original center A. The entire race is then quenched from the proper temperature to harden the carburized section, and thereafter ground to final dimensions.

The parent metal of the inner races may be as usual of S. A. E. 4620 steel case hardened to a Rockwell C reading of 58–60, but the alloys which are applied to the loaded side of the races are actually softer than the steel constituting the balance of the race. Any of the S. A. E. carburizing steels, such as 4620, 4815, 3115 and 1020, after case hardening, are subject to spalling under high loads and impact. In spalling of a roller race, what takes place in service is that the case or shell (carburized surface) which may be $\frac{3}{32}''$ thick, actually breaks away or chips off from the core and this is what the invention is designed to prevent. In other words, the wear resisting alloy, a typical analysis of which has already been given is applied to prevent the spalling and at the same time retain abrasion resistance. Many alloys have been designed and developed for the specific purpose of resisting impact, while retaining abrasion resistance and such an alloy is suitable for the present purpose.

Upon occasion, it may be desirable to apply the wear resistant material about the entire periphery of the raceway. Such a modified ball or roller bearing raceway is indicated at 39 in Fig. 4. In the latter case the ball or roller bearing raceway is first made undersize in diameter as indicated at 40 to allow for the thickness of the intended layer of impact and/or abrasion resisting alloy or material 41 and said material applied and finished in due course. It is thus clear that even though the wear resistant material is not homogeneous with the rest of the spindle it nonetheless becomes an inseparable and virtually integral part of the raceway to which it is applied.

In any event the main feature of the invention is to reinforce the surfaces of rolling bearing raceways of any type directly with impact and abrasion resistant alloys and materials upon at least the loaded portions thereof, and if desired upon the entire periphery of the same, with the result that the portions of said bearing surfaces and raceways usually chipped away first will instead retain their useful dimensions and condition for a long time and thereby greatly increase the useful life of the drill bit or other device thus equipped.

Manifestly the invention includes all types of rolling bearing raceways for cylindrical, tapered, spherical, or other bearings and modifications and variations may be resorted to within the scope of the appended claims.

What is claimed is:

1. In an earth boring drill, a steel spindle adapted to be carried by a rotatable bit head and to be enclosed by a roller cutter, a rolling bearing raceway on the spindle, and a row of rolling bearings disposed thereon and adapted to engage a corresponding raceway within said roller cutter to support said spindle during the drilling operation, the loaded section of the spindle raceway being formed with a layer of permanently applied adherent bearing surface material which is relatively softer and more resistant to continued impact and spalling than the steel composing the main body of said spindle.

2. A rolling bearing structure for operably mounting a rotatable member, comprising a bearing member having exteriorly a rolling bearing raceway adapted to be surrounded by the rotatable member, a row of rolling bearings disposed upon said raceway and engaging with a corresponding raceway within said rotatable member to maintain the same and the bearing member in a mutually concentric relation wherein the one member supports the other, and a fixed peripheral layer of permanently applied bearing surface material consisting of an alloy having relatively less hardness but greater resistance to continued impact and spalling than that of the main body of said bearing member said alloy being foreign to the parent metal of said raceway and being deposited upon the rolling bearing raceway and forming the working surface thereof.

3. In an earth boring drill, a steel spindle adapted to be carried by a rotatable bit head and to be enclosed by a roller cutter, a rolling bearing raceway on the spindle, and a row of rolling bearings disposed thereon and adapted to engage a corresponding raceway within said roller cutter to support said spindle during the drilling operation, the loaded section of the spindle raceway being formed with a layer of permanently applied adherent surface alloy foreign to the underlying parent metal of the steel spindle and comprising about 37% iron, about 9% tungsten, about 17% chromium, about 4% molybdenum, about 28% cobalt and nickel, about .9% vanadium, and about 2.5% carbon, which alloy has a Rockwell hardness index of about C-45 and is relatively more resistant to continued impact and spalling than the steel alloy composing the main body of said spindle.

ROBINSON W. BROWN.

REFERENCES CITED

The following references are of record in the file of this patent:

UNITED STATES PATENTS

| Number | Name | Date |
| --- | --- | --- |
| 846,908 | Cooper | Mar. 12, 1907 |
| 1,928,627 | Lothrop | Oct. 3, 1933 |
| 2,034,545 | Umstattd | Mar. 17, 1936 |
| 2,294,629 | Reed | Sept. 1, 1942 |
| 2,329,751 | Fermier | Sept. 21, 1943 |
| 2,373,369 | Abbott et al. | Apr. 10, 1945 |